United States Patent [19]
Vavagiakis

[11] Patent Number: 5,224,864
[45] Date of Patent: Jul. 6, 1993

[54] METHOD OF RECORDING AND REPRODUCING SUBLIMINAL SIGNALS THAT ARE 180 DEGREES OUT OF PHASE

[76] Inventor: Steven Vavagiakis, 118-17 97th Ave., Richmond Hill, N.Y. 11419

[21] Appl. No.: 674,138

[22] Filed: Mar. 25, 1991

[51] Int. Cl.$^5$ .................. G09B 5/04; G09B 19/00; A61M 21/00; H04R 3/02
[52] U.S. Cl. .................. 434/319; 434/236; 600/28; 381/73.1
[58] Field of Search .............. 434/307, 319, 236, 262; 360/90, 22, 18, 20; 352/131; 358/142; 73/156; 381/73.1, 105, 124, 51, 71, 74, 97; 395/2; 346/1.1; 600/28, 27

[56] References Cited

U.S. PATENT DOCUMENTS

| | | | |
|---|---|---|---|
| 4,315,502 | 2/1982 | Gorges | 600/27 |
| 4,395,600 | 7/1983 | Lundy et al. | 381/73.1 |
| 4,658,306 | 4/1987 | Daigaku et al. | 360/22 |
| 4,777,529 | 10/1988 | Schultz et al. | 434/307 |

*Primary Examiner*—Richard J. Apley
*Assistant Examiner*—John P. Leubecker

[57] ABSTRACT

A subliminal recording includes both subliminal message and mask signals applied to both tracks of a two track recording medium. The subliminal message signals are identical in content, and are recorded in an out-of-phase relationship. The mask signals are recorded in phase. The resulting recording may be utilized in the conventional manner for subliminal recordings. By combining the composite signals in an inverted relationship, the mask signals cancel while the subliminal message signals are additive, thus allowing the presence of the subliminal message signal to be confirmed on the recording.

1 Claim, 3 Drawing Sheets

METHOD OF RECORDING AND REPRODUCING SUBLIMINAL SIGNALS THAT ARE 180 DEGREES OUT OF PHASE

BACKGROUND OF THE INVENTION

The techniques of training or teaching through the use of subliminal audio signals is well known, as presented, for example, in U.S. Pat. No. 3,060,795 to Corrigan and U.S. Pat. No. 3,278,676 to Becker. In such methodology an audio recording, typically on audiotape, is prepared with a recording of a desired spoken message at a first, low volume. This is the subliminal message signal. A second audio signal, typically music, is also impressed on the recording medium at a second, higher amplitude. The second signal masks the first such that the first cannot be perceived by the listener upon playback. The theory of subliminal perception states that while the first, subliminal signal cannot be perceived in the normal manner, its existence on the recording medium and playback at a subliminal level results in the unconscious receipt of the signal and a corresponding effect upon the listener. Depending on the content of the subliminally recorded message, such recordings have been used for a variety of training regimens, such as weight control, smoking cessation, memory development, and the like.

Because a subliminal recording, by definition, includes a message signal which is not intended to be consciously perceived by the listener in the normal manner, the listener is not likely to be consciously "aware" of the existence of a subliminal message in a recording. Despite some questions as to the actual effect of such signals, prohibitions exist against the use of such material in certain situations, such as in broadcast advertisements, to guard against the presentation of such material to those not consenting to its use.

On the other hand, the user of a subliminal recording has the vital concern that the intended subliminal message is in fact there. The user, having invested in the recording, properly has the interest that, for example, the stop-smoking tape he purchased does indeed have a motivation message to assist him or her in his quest. In addition, the user may wish to be assured that the content of the subliminal track is acceptable, and does not contain material which he or she would find objectionable or improper for the intended purpose. Since the very essence of a subliminal recording is that the subliminal message cannot be perceived normally, that quality serves as a bar to verification of its existence.

Other than at the master recording level, where the subliminal and supraliminal mask signals are blended together and thus can be identified, it's extremely difficult to confirm the existence of a subliminal message signal on a recording. This leaves the recording manufacturer with the risk of claims that the subliminal message is non-existent or other than what it is alleged to be, and places the user of the recording in the uncomfortable position of being unable to verify the legitimacy and suitability of the product he has obtained.

It is accordingly a purpose of the present invention to provide a subliminal recording bearing a subliminal message track, the presence of which can be verified using a minimal amount of equipment.

Another purpose of the present invention is to provide a subliminal message recording which can be verified by the user.

Yet another purpose of the present invention is to provide a subliminal message recording in which the level of the subliminal recording can be raised without damaging the subliminal nature of the track.

SUMMARY OF THE INVENTION

In accordance with the above and other and additional purposes and objects, the present invention comprises an audio recording and a method of making same in which the recording has a subliminal message signal and a masking signal mixed together. A stereophonic or two track recording process is utilized, in which a monaural masking signal is placed on both tracks in an in-phase relationship. A monaural subliminal message is also placed on both tracks, but in a 180° inverted phase relationship between the tracks. The masking signal and the subliminal message signal for each track are combined in the normal manner for a subliminal recording, the relative amplitudes of the signals being chosen such that the subliminal signal is masked by the other signal. The resulting recording can be used in the conventional manner on stereophonic or monaural playback equipment.

To verify the existence of the subliminal message signal, the signals on the two tracks are combined in a 180° relative phase relationship. Because the masking signals on the two tracks were recorded in phase, the inversion places them in a cancelling relationship, such that the masking signal cannot be heard. The subliminal message signals, on the other hand, being recorded in an out-of-phase relation, are placed in phase by the conversion, such that the signals are combined and become audible. Thus the listener hears only the subliminal message signal and can confirm the existence of the normally-inaudible message. A further benefit of the present invention is that the subliminal message can be recorded at a higher amplitude, the out-of-phase relationship between the left and right channel signals on two track playback providing a further deadening effect to conscious perception of the message.

BRIEF DESCRIPTION OF THE DRAWINGS

A fuller understanding of the present invention can be accomplished upon consideration of the following detailed description of a preferred, but nonetheless illustrative embodiment of the present invention when reviewed in connection with the annexed drawings, wherein.

DETAILED DESCRIPTION OF A PREFERRED EMBODIMENT

Figure 1:
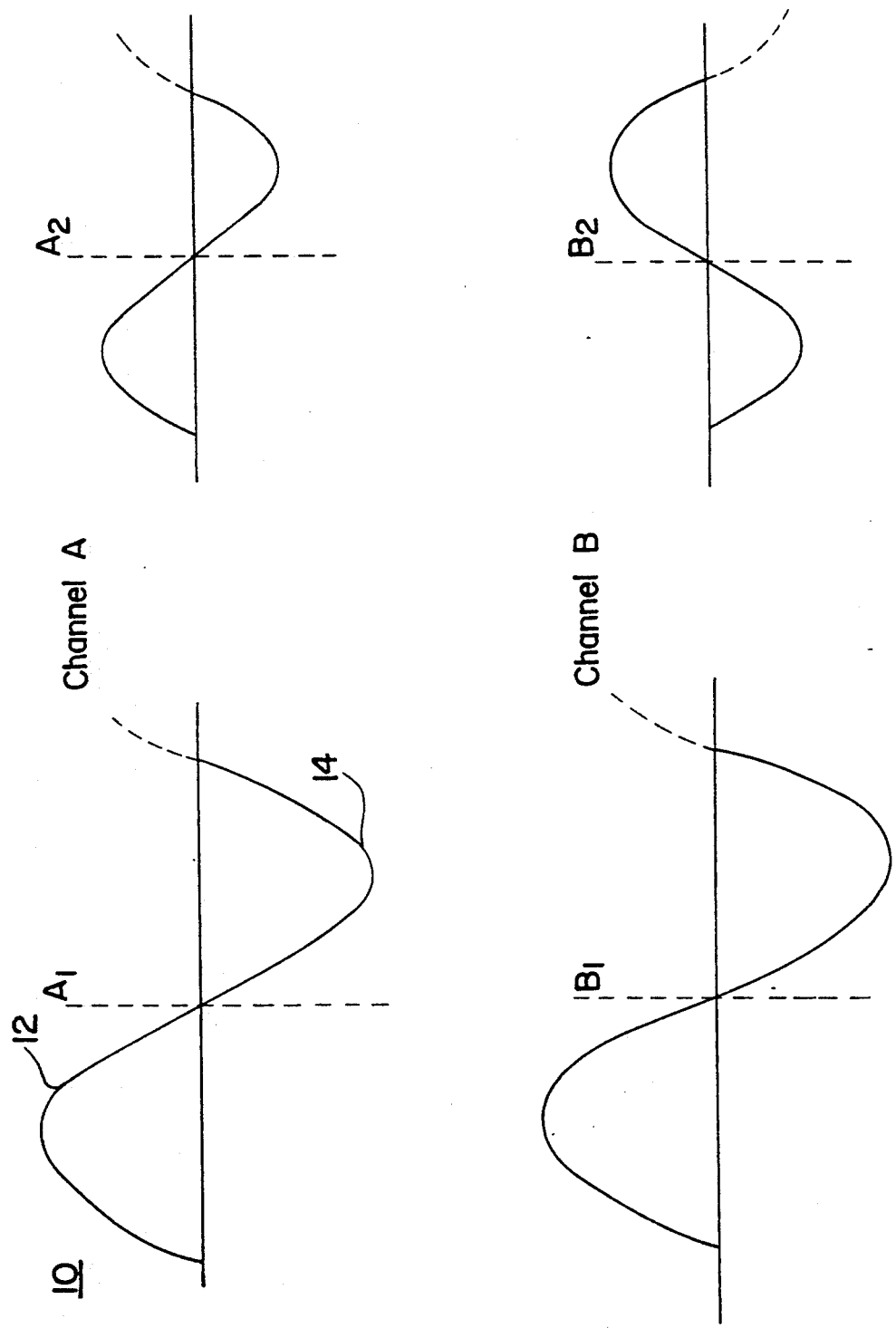
FIG. 1 is a representation of in-phase and out-of-phase signals.

As depicted in FIG. 1, a generalized waveform 10 such as signal $A_1$ has both positive and negative going portions 12, 14, respectively, with respect to a baseline. While the figure depicts a sinusoid of a single frequency, fourier analysis teaches that complex waveforms, such as that generated by music or speech, can be defined as a combination of a series of sinusoids of varying amplitudes and frequencies. When two sinusiods of the same frequency have their respective peaks and zero-crossings aligned in time, the signals are in phase, and the combining of the signals results in a signal having an maximum amplitude equal to the sum of the amplitudes of the individual components.

When the peaks and zero crossings of two signals of the same frequency are displaced in time by the equivalent of one-half the period (180° or $\pi$ radians), the signals are said to be fully out-of-phase, and the combination of the two signals results in a cancellation of the signal. Thus, if an audio signal is combined with an otherwise identical signal 180° out of phase with it, cancellation of the two signals results. Because of certain nonlinearities of a complex signal, the cancellation may not be complete, but the degree of cancellation is significant and causes a meaningful diminution, if not complete cancellation, of the resulting signal.

Signals $A_1$ and $B_1$ represent the masking signals applied to channels or tracks A and B of a convention stereophonic recording, typically on audiotape. These signals are identical, are in phase with each other, and typically consist of music chosen in accordance with the nature of the subliminal message to be recorded or as otherwise desired.

Signals $A_2$ and $B_2$ represent the subliminal message similarly placed on the tracks A and B of the recording medium. These signals are again identical in content, but as shown are 180° out of phase with each other. The amplitude of the recorded subliminal message signals on each track is less than that of the amplitude of the masking signals as known.

Figure 2:
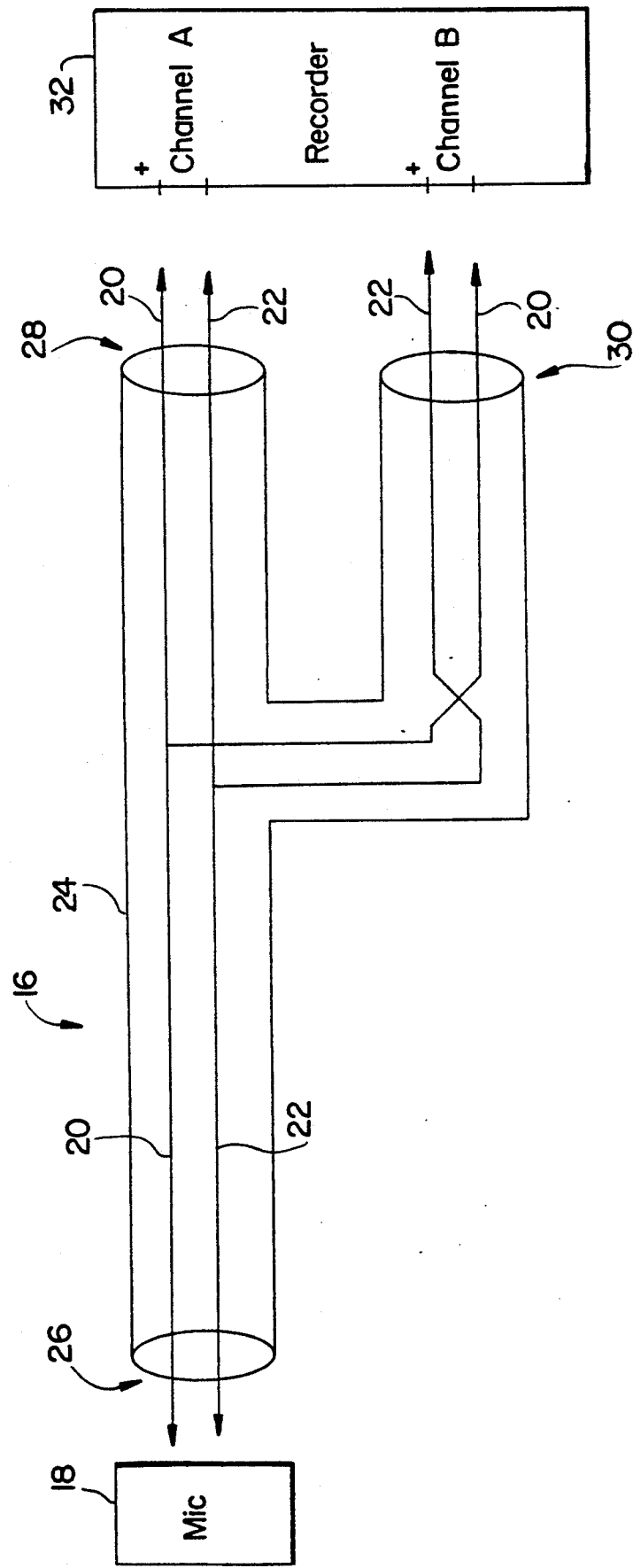
FIG. 2 is a representation of a cable able to provide a 180° phase shift between signals as required in the present invention.
Figure 3:
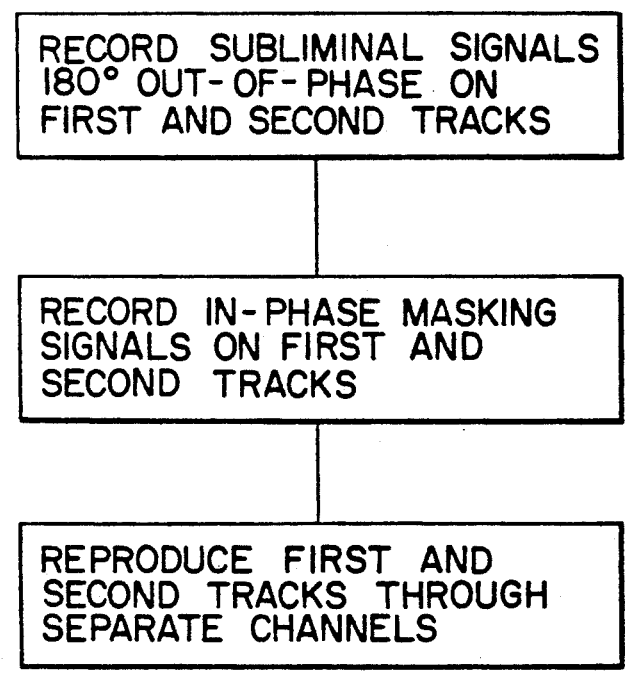
FIG. 3 is a representation of the steps required to record and reproduce the subliminal signal.

The subliminal recording of the present invention can be produced using conventional recording apparatus. In general, any equipment capable of producing a two-track (stereo) recording can be used. The subliminal message signals may be produced using a cable 16 as shown in FIG. 2, in conjunction with a conventional microphone 18. The cable 16 consists of two signal leads 20, 22 within a typically coaxial ground lead 24, providing a balanced signal on the leads with respect to the ground. As known in the art, one of the two signal leads is identified as the "hot" or "positive" lead, although for the present invention, either lead may be so designated. Such a designation allows polarity-correct connections to be made.

The cable is formed into a Y configuration, yielding a first input end terminal 26 and a pair of output terminal ends 28, 30, each of which serves as the input to one of the channels of the recording apparatus 32. The sense of one pair of terminal leads is inverted with respect to the other such that, for example, if lead 20 was designated as the hot lead at terminal 28 lead 22 is considered the hot lead at terminal 30 for purposes of connection to the recording equipment 32. This inversion results in the signals at the terminals 28, 30 being 180° out of phase to each other.

The recording of the subliminal track is made such that there is no crossover through the recording apparatus 32 from one channel to the other. This typically can be insured by panning the respective channels full left and right to avoid mixing of the channel signals. Each of the recorded tracks thus contain exclusively one of the out-of-phase signals. The subliminal signals can then be combined with the in-phase masking signals. The masking signal applied to both channels should be fully monaural, insuring that it is identical on both channels. The use of delay lines, harmonizers and the like is to be avoided as they can alter the phase relationship between the channels. The subliminal and masking tracks are combined on the recording media by appropriate means as known in the art, such as through a mixer, or by overrecording.

The resulting recording, bearing in-phase masking signals and 180° out-of-phase subliminal message signals, may be utilized in the conventional manner where each track is played over a separate channel for subliminal messaging, either one or both channels being played. Because the subliminal message signals are 180° out of phase, they can be recorded at up to about a 3 decibel increase over conventional subliminal tracks for two track or stereophonic playback, as the spatial cancellation of the out-of-phase signals upon playback provides a greater degree of masking than in conventional subliminal recordings.

To confirm the existence of the subliminal message signal, the cable of FIG. 2 can again be used, wherein the terminals 28, 30 are each connected to a channel output of stereophonic playback equipment and the terminal 26 is connected to a speaker or the like. With the recording played back in a balanced mode, the cable inverts the input signals such that the masking signals, which were recorded in phase, are inverted and combined to cancel each other out at terminal 26. Accordingly, the mask track is no longer audible. The subliminal message signals, on the other hand, being inverted, are reinverted an additional 180°, resulting in a 360° shift, allowing the signals to be additive, whereby the combined signal becomes audible. Confirmation of the existence of the signal is thus established.

I claim:

1. A method for the recording and subsequent reproduction of a subliminal message recording, comprising the steps of placing both a subliminal message signal and a mask signal upon first and second tracks of a recording medium for simultaneous playback, said subliminal message signal on each of said tracks being of identical content and in a 180° out-of-phase relationship, said mask signal on each of said first and second tracks being of identical content and in an in-phase relationship, the amplitudes of said subliminal message and mask signals being chosen such that the subliminal message signal cannot be perceived upon playback, and playing back each of said tracks through a separate channel of a multi-channel playback apparatus.

* * * * *